United States Patent
Li et al.

(10) Patent No.: US 10,354,118 B2
(45) Date of Patent: Jul. 16, 2019

(54) FINGERPRINT RECOGNITION METHOD AND FINGERPRINT RECOGNITION APPARATUS

(71) Applicant: SHENZHEN GOODIX TECHNOLOGY CO., LTD., Shenzhen (CN)

(72) Inventors: Shunzhan Li, Shenzhen (CN); Wangwang Yang, Shenzhen (CN); Wei Zhang, Shenzhen (CN); Yudong Wang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 26 days.

(21) Appl. No.: 15/642,271

(22) Filed: Jul. 5, 2017

(65) Prior Publication Data
US 2017/0300738 A1 Oct. 19, 2017

Related U.S. Application Data

(63) Continuation of application No. PCT/CN2016/089953, filed on Jul. 14, 2016.

(30) Foreign Application Priority Data

Dec. 31, 2015 (CN) .......................... 2015 1 1031444

(51) Int. Cl.
*G06K 9/00* (2006.01)
*G06K 9/20* (2006.01)
(Continued)

(52) U.S. Cl.
CPC .......... *G06K 9/00087* (2013.01); *G06K 9/00* (2013.01); *G06K 9/0004* (2013.01);
(Continued)

(58) Field of Classification Search
CPC .......... G06K 9/00087; G06K 9/00107; G06K 9/0004; G06K 9/2018; G06K 9/00; G06F 21/45; G06F 21/32
(Continued)

(56) References Cited

U.S. PATENT DOCUMENTS 5,737,439 A 4/1998 Lapsley et al.
7,254,255 B2 8/2007 Dennis
(Continued)

FOREIGN PATENT DOCUMENTS

CN 101120879 A * 2/2008 ........... A61B 5/0059
CN 101120879 A 2/2008
(Continued)

OTHER PUBLICATIONS

International Search Report for International Application No. PCT/CN2016/089953, Applicant: Shenzhen Goodix Technology Co., Ltd., dated Oct. 19, 2016, 4 pages.
(Continued)

*Primary Examiner* — Amandeep Saini

(57) ABSTRACT

Embodiments of the present disclosure provide a fingerprint recognition method and a fingerprint recognition apparatus, where the method includes: collecting a plurality of optical signals of a finger to be detected; and judging whether the finger to be detected is a living body according to the plurality of optical signals of the finger to be detected. The method provided in the embodiments of the present disclosure may improve the security of the fingerprint recognition technology, and may effectively avoid the problem that fingerprint recognition is cracked using an artificial body fingerprint.

20 Claims, 7 Drawing Sheets

(51) Int. Cl.
  *G06F 21/32* (2013.01)
  *G06F 21/45* (2013.01)
(52) U.S. Cl.
  CPC ....... *G06K 9/00107* (2013.01); *G06K 9/2018*
    (2013.01); *G06F 21/32* (2013.01); *G06F 21/45*
    (2013.01)
(58) Field of Classification Search
  USPC ........................................................ 382/125
  See application file for complete search history.

(56) References Cited

U.S. PATENT DOCUMENTS

| | | | |
|---|---|---|---|
| 7,616,295 | B2 | 11/2009 | Yokoyama et al. |
| 2005/0008197 | A1 | 1/2005 | Dennis |
| 2008/0037001 | A1 | 2/2008 | Yokoyama et al. |
| 2015/0036000 | A1* | 2/2015 | Cho ..................... G06F 1/1686 348/207.1 |
| 2015/0193669 | A1 | 7/2015 | Gu et al. |
| 2017/0032176 | A1* | 2/2017 | Higuchi ............... A61B 5/0077 |

FOREIGN PATENT DOCUMENTS

| | | | |
|---|---|---|---|
| CN | 104239869 | A * | 12/2014 |
| CN | 104239869 | A | 12/2014 |
| CN | 204087229 | U | 1/2015 |
| CN | 104951769 | A | 9/2015 |
| CN | 105046240 | A | 11/2015 |
| KR | 10-1997-0049828 | A | 7/1997 |
| KR | 10-2004-0005266 | A | 1/2004 |

OTHER PUBLICATIONS

Partial supplementary European search report for corresponding EP Application No. 16874104.9, Applicant: Shenzhen Goodix Technology Co., Ltd., dated Feb. 22, 2018, 9 pages.
Nixon K A et al: "Multispectral fingerprint imaging for spoof detection", Visual Communications and Image Processing; 20-1-2004-20-1-2004; San Jose, vol. 5779, No. 1, Mar. 28, 2005, pp. 214-225, XP008098861.
Dana Lodrova: "Security of Biometric Systems", Information Sciences and Technologies, Sep. 1, 2013, pp. 13-31, XP055451548.
XP055482837-V1P1N Gupta et al: "Design and Development of Anti-Spoofing based measurement of Heart Rate, Temperature Blood Oxygen level using Low Cost Microcontroller", International Journal of Electronics and Computer Science Engineering , vol. 1, No. 3, Jun. 2012, (abstract, Sections 11. , 11.C, 11.D).
XP011237864—Reddy P V et al: "A New Antispoofing Approach for Biometric Devices", IEEE Transactions on Biomedical Circuits and Systems, IEEE, US, vol. 2, No. 4, Dec. 1, 2008, (Section IV , A and B).
XP055482842—Mojtaba Sepasian et al: "Liveness and spoofing in fingerprint identification: issues and challenges", Recent Advances in Computer Engineering and Applications, Jan. 1, 2010, pp. 150-158, (Section 4).
XP008122622—Davide Maltoni et al: "Securing Fingerprint Systems", Handbook of Fingerprint Recogni, Springer, London, GB, Jan. 1, 2009, pp. 371-416, (Sections 9.1 and 9.5).
Office Action for Korean Application No. 10-2017-7014753, Applicant: Shenzhen Goodix Technology Co., Ltd., dated Nov. 1, 2017, 7 pages.

* cited by examiner

FINGERPRINT RECOGNITION METHOD AND FINGERPRINT RECOGNITION APPARATUS

CROSS-REFERENCE TO RELATED APPLICATIONS

The present application is a continuation of international application No. PCT/CN2016/089953, filed on Jul. 14, 2016, which claims the priority to Chinese Patent Application No. 201511031444.2, filed with the Chinese Patent Office on Dec. 31, 2015, and entitled "FINGERPRINT RECOGNITION METHOD AND FINGERPRINT RECOGNITION APPARATUS", both of which are incorporated herein by reference in its entirety.

TECHNICAL FIELD

The present disclosure relates to the technical field of biometric recognition, and in particular, to a fingerprint recognition method and a fingerprint recognition apparatus.

BACKGROUND

As a unique feature of a human body, a fingerprint possesses lifelong invariability, uniqueness and convenience. Nowadays, the fingerprint recognition technology has been widely used in devices such as a collection system, an entrance guard system and an intelligent phone set. As a capacitive fingerprint recognition technology is gradually popularized in application functions such as cellphone fingerprint unlocking and cellphone on-line fingerprint payment, higher requirements are also raised on the security of a fingerprint. A fingerprint recognition technology based on capacitance has a risk of being cracked, and fingerprint recognition functions on various cellphone models may be cracked successfully by acquiring a fingerprint image and printing an artificial fingerprint using a special material.

Therefore, it is necessary to put forward a more secure fingerprint recognition technology.

SUMMARY

Embodiments of the present disclosure provide a fingerprint recognition method and a fingerprint recognition apparatus, which is a fingerprint recognition technology being able to improve the security of fingerprint recognition.

According to a first aspect, provided is a fingerprint recognition method, including: collecting a plurality of optical signals of a finger to be detected; and judging whether the finger to be detected is a living body according to the plurality of optical signals of the finger to be detected.

With reference to the first aspect, in a first possible implementation manner of the first aspect, the judging whether the finger to be detected is a living body according to the plurality of optical signals of the finger to be detected includes: acquiring the plurality of optical signals of the finger to be detected using light wave(s) of n wavelengths, the plurality of optical signals comprising first light reflection intensities $I_{11}, I_{12}, \ldots, I_{1n}$ caused by the finger to be detected before the finger to be detected touches a fingerprint recognition apparatus, where an $i^{th}$ wavelength in the n wavelengths corresponds to an $i^{th}$ first light reflection intensity $I_{1i}$; and determining that the finger to be detected is the living body when the first light reflection intensity $I_{1i}$ is within a first threshold interval $T_{1i}$, where $1 \leq i \leq n$.

With reference to the first aspect and the above implementation manner thereof, in a second possible implementation manner of the first aspect, the judging whether the finger to be detected is a living body according to the plurality of optical signals of the finger to be detected includes: acquiring the plurality of optical signals of the finger to be detected using light wave(s) of m wavelengths, and measuring second light reflection intensities $I_{21}, I_{22}, \ldots, I_{2m}$ caused by the finger to be detected when the finger to be detected touches the fingerprint recognition apparatus, where an $i^{th}$ wavelength in the m wavelengths corresponds to an $i^{th}$ second light reflection intensity $I_{2i}$; and determining that the finger to be detected is the living body when the second light reflection intensity $I_{2i}$ is within a second threshold interval $T_{2i}$, where $1 \leq i \leq m$.

With reference to the first aspect and the above implementation manners thereof, in a third possible implementation manner of the first aspect, the judging whether the finger to be detected is a living body according to the plurality of optical signals of the finger to be detected includes: measuring, if the n wavelengths and the m wavelengths have the same k wavelengths, the first light reflection intensities $I_{11}, I_{12}, \ldots$, and the second light reflection intensities $I_{21}, I_{22}, \ldots, I_{2k}$ using the k wavelengths, and determining that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \leq i \leq k$.

With reference to the first aspect and the above implementation manners thereof, in a fourth possible implementation manner of the first aspect, the judging whether the finger to be detected is a living body according to the plurality of optical signals of the finger to be detected includes: determining whether the finger to be detected is the living body according to whether the plurality of optical signals of the finger to be detected comply with a heart rate characteristic.

With reference to the first aspect and the above implementation manners thereof, in a fifth possible implementation manner of the first aspect, the determining whether the finger to be detected is the living body according to whether the plurality of optical signals of the finger to be detected comply with a heart rate characteristic includes: acquiring the plurality of optical signals of the finger to be detected using light wave(s) of s wavelengths, the plurality of optical signals being PPG signals $S_1, S_2, \ldots, S_s$, where an $i^{th}$ wavelength in the s wavelengths corresponds to an $i^{th}$ PPG signal $S_i$, and the $i^{th}$ PPG signal $S_i$ has a period being $P_i$, and an amplitude being $A_i$; and determining that the finger to be detected is the living body when the period being $P_i$ is within a fourth threshold interval $T_{4i}$, and the amplitude being $A_i$ is within a fifth threshold interval $T_{5i}$, where $1 \leq i \leq s$.

With reference to the first aspect and the above implementation manners thereof, in a sixth possible implementation manner of the first aspect, the judging whether the finger to be detected is a living body according to the plurality of optical signals of the finger to be detected includes: measuring, when the finger to be detected is irradiated using a light wave of a first wavelength, a first optical signal of the finger to be detected, then acquiring a direct current component of the first optical signal and an alternating current component of the first optical signal; measuring, when the finger to be detected is irradiated using a light wave of a second wavelength, a second optical signal of the finger to be detected, then acquiring a direct current component of the second optical signal and an alternating current component of the second optical signal, where the first wavelength and the second wavelength are different; acquiring blood oxygen saturation of the finger to be detected using the direct current component of the first optical signal, the alternating current component of the first optical signal, the direct current component of the second optical signal and the alternating current component of the second optical signal; and determining that the finger to be detected is the living body when the blood oxygen saturation is within a sixth threshold interval.

With reference to the first aspect and the above implementation manners thereof, in a seventh possible implementation manner of the first aspect, the method further includes: determining, if there are M kinds of judgment manners and combination manners thereof for the judging whether the finger to be detected is a living body according to the plurality of optical signals of the finger to be detected, that the finger to be detected is the living body when it is judged that the finger to be detected is the living body by selecting and using one of the M kinds of manners according to a requirement on a security level of an application scenario.

With reference to the first aspect, in an eighth possible implementation manner of the first aspect, the method further includes: performing fingerprint matching on a fingerprint of the finger to be detected, and judging whether the fingerprint matching of the finger to be detected is successful; and determining that fingerprint recognition of the finger to be detected is successful when the finger to be detected is the living body and the fingerprint matching of the finger to be detected is successful.

According to a second aspect, provided is a fingerprint recognition apparatus, including: an optical collection unit, the optical collection unit being configured to collect a plurality of optical signals of a finger to be detected; and a living body detection unit, the living body detection unit being configured to judge whether the finger to be detected is a living body according to the plurality of optical signals of the finger to be detected.

With reference to the second aspect, in a first possible implementation manner of the second aspect, the optical collection unit is configured to: acquire the plurality of optical signals of the finger to be detected using light wave(s) of n wavelengths, the plurality of optical signals comprising first light reflection intensities $I_{11}, I_{12}, \ldots, I_{1n}$ caused by the finger to be detected before the finger to be detected touches the fingerprint recognition apparatus, where an $i^{th}$ wavelength in the n wavelengths corresponds to an $i^{th}$ first light reflection intensity $I_{1i}$; and the living body detection unit is specifically configured to: determine that the finger to be detected is the living body when the first light reflection intensity $I_{1i}$ is within a first threshold interval $T_{1i}$, where $1 \leq I \leq n$.

With reference to the second aspect and the above implementation manner thereof, in a second possible implementation manner of the second aspect, the optical collection unit is configured to: acquire the plurality of optical signals of the finger to be detected using light wave(s) of m wavelengths, and measure second light reflection intensities $I_{21}, I_{22}, \ldots, I_{2m}$ caused by the finger to be detected when the finger to be detected touches the fingerprint recognition apparatus, where an $i^{th}$ wavelength in the m wavelengths corresponds to an $i^{th}$ second light reflection intensity $I_{2i}$; and the living body detection unit is specifically configured to: determine that the finger to be detected is the living body when the second light reflection intensity $I_{2i}$ is within a second threshold interval $T_{2i}$, where $1 \leq i \leq m$.

With reference to the second aspect and the above implementation manners thereof, in a third possible implementation manner of the second aspect, the living body detection unit is specifically configured to: measure, if the n wavelengths and the m wavelengths have the same k wavelengths, the first light reflection intensities $I_{11}, I_{12}, \ldots, I_{1k}$ and the second light reflection intensities $I_{21}, I_{22}, \ldots, I_{2k}$ using the k wavelengths, and determine that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \leq i \leq n$.

With reference to the second aspect and the above implementation manners thereof, in a fourth possible implementation manner of the second aspect, the optical collection unit is configured to: determine whether the finger to be detected is the living body according to whether the plurality of optical signals of the finger to be detected comply with a heart rate characteristic.

With reference to the second aspect and the above implementation manners thereof, in a fifth possible implementation manner of the second aspect, the optical collection unit is configured to: acquire the plurality of optical signals of the finger to be detected using light wave(s) of s wavelengths, the plurality of optical signals being PPG signals $S_1, S_2, \ldots, S_s$, where an $i^{th}$ wavelength in the s wavelengths corresponds to an $i^{th}$ PPG signal $S_i$, and the $i^{th}$ PPG signal Si has a period being $P_i$, and an amplitude being $A_i$; and the living body detection unit is specifically configured to: determine that the finger to be detected is the living body when the period being $P_i$ is within a fourth threshold interval $T_{4i}$, and the amplitude being $A_i$ is within a fifth threshold interval $T_{5i}$, where $1 \leq j \leq s$.

With reference to the second aspect and the above implementation manners thereof, in a sixth possible implementation manner of the second aspect, the optical collection unit is configured to: measure, when the finger to be detected is irradiated using a light wave of a first wavelength, a first optical signal of the finger to be detected, then acquire a direct current component of the first optical signal and an alternating current component of the first optical signal; and measure, when the finger to be detected is irradiated using a light wave of a second wavelength, a second optical signal of the finger to be detected, then acquire a direct current component of the second optical signal and an alternating current component of the second optical signal, where the first wavelength and the second wavelength are different; and the living body detection unit is specifically configured to: acquire blood oxygen saturation of the finger to be detected using the direct current component of the first optical signal, the alternating current component of the first optical signal, the direct current component of the second optical signal and the alternating current component of the second optical signal; and determine that the finger to be detected is the living body when the blood oxygen saturation is within a sixth threshold interval.

With reference to the second aspect and the above implementation manners thereof, in a seventh possible implementation manner of the second aspect, the fingerprint recognition apparatus further includes an application unit, the application unit is further configured to: determine, if there are M kinds of judgment manners and combination manners thereof for the judging whether the finger to be detected is a living body according to the plurality of optical signals of the finger to be detected, that the finger to be detected is the living body when it is judged that the finger to be detected is the living body by selecting and using one of the M kinds of manners according to a requirement on a security level of an application scenario.

With reference to the second aspect, in an eighth possible implementation manner of the second aspect, further includes: a fingerprint image collection unit, the fingerprint image collection unit being configured to collect a fingerprint image of the finger to be detected; a fingerprint recognition unit, the fingerprint recognition unit being configured to perform fingerprint matching on the fingerprint image of the finger to be detected, and judge whether a result of the fingerprint matching of the finger to be detected is successful; and an application unit, the application unit being configured to determine that fingerprint recognition of the finger to be detected is successful when the finger to be detected is the living body and the fingerprint matching of the finger to be detected is successful.

The embodiments of the present disclosure judge whether a finger to be detected is a living body according to signals of the finger to be detected, and determine that a fingerprint recognition result of the finger to be detected is successful when it is determined that the finger to be detected is the living body and fingerprint matching of the finger to be detected is successful. Therefore, the method provided in the embodiments of the present disclosure may improve the security of the fingerprint recognition technology, and may effectively avoid the problem that fingerprint recognition is cracked using an artificial body fingerprint.

BRIEF DESCRIPTION OF DRAWINGS

To describe the technical solutions in the embodiments of the present disclosure more clearly, the following briefly introduces the accompanying drawings required in the embodiments of the present disclosure. Apparently, the accompanying drawings in the following description are merely some embodiments of the present disclosure, and other drawings may be obtained based on these drawings by a person of ordinary skill in the art without involving inventive efforts.

DESCRIPTION OF EMBODIMENTS

The technical solution in the embodiments of the present disclosure will be described clearly and fully below with reference to the drawings in the embodiments of the present disclosure, and apparently, the embodiments described are only a part of the embodiments of the present disclosure, not all of them. All of the other embodiments, obtained by a person of ordinary skill in the art based on the embodiments of the present disclosure without involving any creative effort, fall into the protection scope of the present disclosure.

Figure 1:
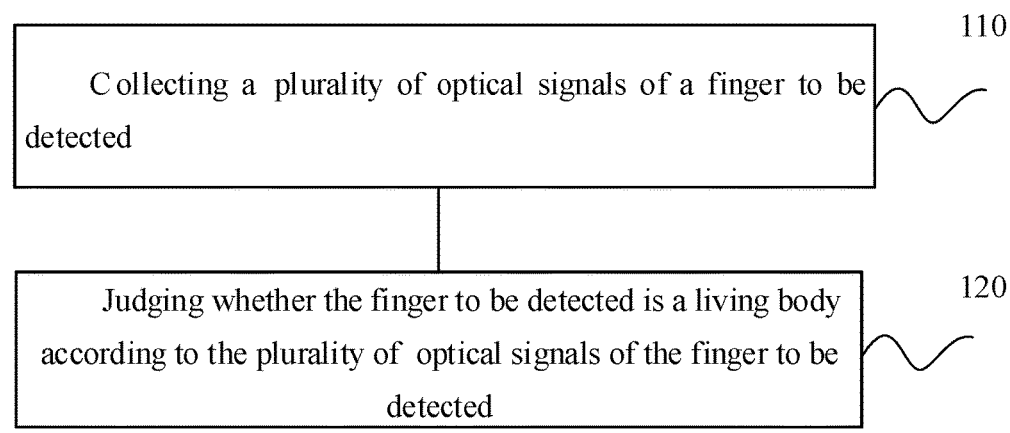
FIG. 1 is a schematic flow chart of a fingerprint recognition method of the present disclosure.

FIG. 1 is a schematic flow chart of a fingerprint recognition method of the present disclosure. As shown in FIG. 1, an executive body of the method is a fingerprint recognition apparatus, and the method 100 includes:

step 110, collecting a plurality of optical signals of a finger to be detected; and step 120, judging whether the finger to be detected is a living body according to the plurality of optical signals of the finger to be detected.

In step 110, the finger to be detected may include an artificial body finger or a dead body finger, and may also include a living body finger. Whether the finger to be detected is a living body is judged through the acquired plurality of optical signals of the finger to be detected.

Figure 2:
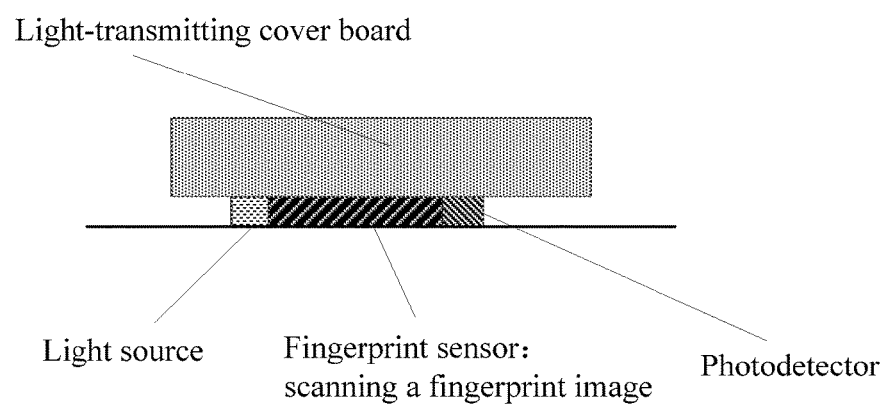
FIG. 2 is a schematic diagram of a fingerprint recognition apparatus in an embodiment of the present disclosure.

FIG. 2 is a schematic diagram of a fingerprint recognition apparatus in an embodiment of the present disclosure. As shown in FIG. 2, the fingerprint recognition apparatus may include a light source, a photodetector, a light-transmitting cover board and a fingerprint sensor. The step of acquiring a plurality of optical signals of a finger to be detected includes: light emitted by the light source of the fingerprint recognition apparatus is irradiated onto a surface of the finger to be detected, then the photodetector may receive light transmitted or reflected back by the finger to be detected, and convert the received plurality of optical signals into electrical signals, and whether the finger to be detected is a living body may be judged according to the received electrical signals.

The embodiments of the present disclosure judge whether the finger to be detected is a living body according to the plurality of optical signals of the finger to be detected. The method provided in the embodiments of the present disclosure may improve the security of the fingerprint recognition technology, and may effectively avoid the problem that fingerprint recognition is cracked using an artificial body fingerprint.

Optionally, as an embodiment of the present disclosure, judging whether the finger to be detected is a living body according to the plurality of optical signals of the finger to be detected includes: acquiring p light reflection intensities produced by the finger to be detected using light wave(s) of p wavelengths, and judging whether the finger to be detected is the living body according to characteristics of the p light reflection intensities.

Specifically, the above p wavelengths may be used to measure light reflection intensities produced by the p wavelengths respectively before the finger to be detected touches the fingerprint recognition apparatus or when the finger to be detected touches the fingerprint recognition apparatus, and characteristics of the p light reflection intensities produced by the p wavelengths are used to judge whether the finger to be detected is the living body, where the characteristics of the light reflection intensities include: whether the light reflection intensities satisfy a certain threshold condition, whether the continuity, monotonicity and derivability of the p light reflection intensities over time satisfy a certain condition, etc. It should be understood that the present disclosure is not limited to this.

Optionally, as an embodiment of the present disclosure, the step of judging whether the finger to be detected is a living body according to the plurality of optical signals of the finger to be detected includes: acquiring the plurality of optical signals of the finger to be detected using light wave(s) of n wavelengths, the above plurality of optical signals comprising first light reflection intensities $I_{11}$, $I_{12}$, . . . , $I_{1n}$ caused by the finger to be detected before the finger to be detected touches the fingerprint recognition apparatus, where an $i^{th}$ wavelength in the n wavelengths corresponds to an $i^{th}$ first light reflection intensity $I_{1i}$; and determining that the finger to be detected is the living body when the first light reflection intensity $I_{1i}$ is within a first threshold interval $T_{1i}$, where $1 \leq i \leq n$, n being an integer greater than or equal to 1.

Figure 3:
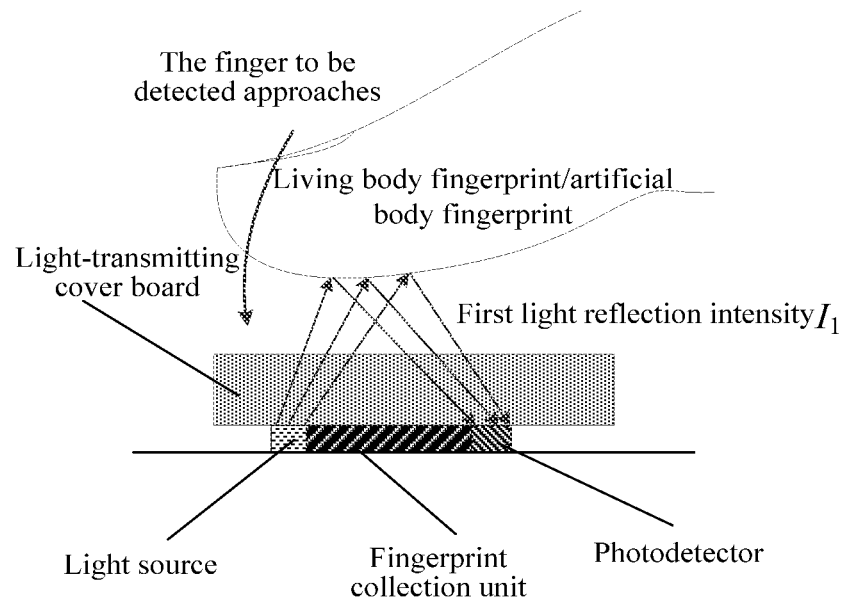
FIG. 3 shows a schematic diagram of measuring a first light reflection intensity I1 according to an embodiment of the present disclosure.

FIG. 3 shows a schematic diagram of measuring a first light reflection intensity according to an embodiment of the present disclosure. As shown in FIG. 3, a range of a wavelength of the light emitted by the light source may be 380 nm-1000 nm, and the n wavelengths may be selected within the above range, for example, when n=3, light wave of a first wavelength is green light with a central wavelength of 525 nm, light wave of a second wavelength is red light with a central wavelength of 625 nm, and light wave of a third wavelength is infrared light with a central wavelength of 840 nm. If the finger to be detected does not touch the fingerprint recognition apparatus, i.e., being at a certain distance from the fingerprint recognition apparatus, the light of the above three wavelengths emitted by the light source will produce diffuse reflection on surface of a fingerprint, and thus the photodetector may detect a light intensity $I_{11}$ obtained from the light wave of the first wavelength, a light intensity $I_{12}$ obtained from the light wave of the second wavelength and a light intensity $I_{13}$ obtained from the light wave of the third wavelength; the diffuse reflection produced on the surface of the finger to be detected is the chief contributor to first light reflection intensities $I_{11}$, $I_{12}$, . . . , $I_{13}$. It should be understood that the distance is generally less than 10 cm, for example, being able to be 5 cm, 3 cm, etc., and the present disclosure is not limited to this.

It should also be understood that, when n=1, it is only required to measure a first light reflection intensity $I_{11}$ produced after light wave of one wavelength is irradiated onto the finger to be detected.

Since a diffuse reflection intensity of an object is related to a color, the roughness and a shape of the object, when color difference, roughness difference and shape difference exist between the artificial body fingerprint and the living body fingerprint, there will also be a difference between diffuse reflection intensities of the artificial body and the living body.

Therefore, whether the finger to be detected is the living body may be judged by judging whether the first light reflection intensity $I_{1i}$ is within a first threshold interval $T_{1i}$. For example, when $T_{1i}$=[200, 500], i.e., $200 \leq I_{1i} \leq 500$, the finger to be detected is the living body, and a unit of the first light reflection intensity is least significant bit (English: Least Significant Bit, LSB for short). When the first light reflection intensities $I_{11}$, $I_{12}$, . . . , $I_{13}$ are respectively within respective first threshold intervals $T_{11}$, $T_{12}$ and $T_{13}$, it is determined that the finger to be detected is the living body. A judgment strategy may also be determining that the finger to be detected is the living body when a part of the first light reflection intensities $I_{11}$, $I_{12}$, . . . , $I_{13}$ is within the respective first threshold interval, which is not limited herein. It should be understood that the above numerical values are merely exemplary, and the present disclosure is not limited to this.

Optionally, as another embodiment of the present disclosure, the step of judging whether the finger to be detected is a living body according to the plurality of optical signals of the finger to be detected includes: acquiring the plurality of optical signals of the finger to be detected using light wave(s) of m wavelengths, and measuring second light reflection intensities $I_{21}$, $I_{22}$, . . . , $I_{2m}$ caused by the finger to be detected when the finger to be detected touches the fingerprint recognition apparatus, where an $i^{th}$ wavelength in the m wavelengths corresponds to an $i^{th}$ second light reflection intensity $I_{2i}$; and determining that the finger to be detected is the living body when the second light reflection intensity $I_{2i}$ is within a second threshold interval $T_{2i}$, where $1 \leq i \leq m$.

It should be understood that the above light wave of m wavelengths and the above light wave of n wavelengths may be the same, or may be different, which is not limited in the embodiments of the present disclosure.

Figure 4:
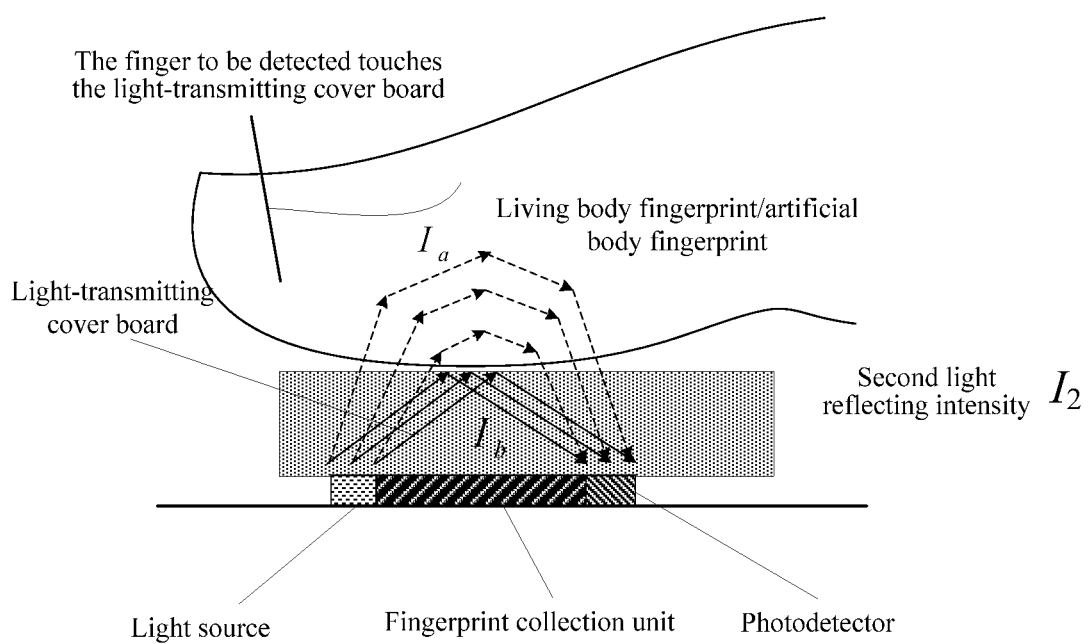
FIG. 4 shows a schematic diagram of measuring a second light reflection intensity I2 according to an embodiment of the present disclosure.

FIG. 4 shows a schematic diagram of measuring a second light reflection intensity according to an embodiment of the present disclosure.

As shown in FIG. 4, for concision, descriptions are given by merely taken the condition when m=1 as an example. After the light source emits a wave of a specific wavelength, the photodetector will detect the second light reflection intensity when the finger to be measured touches the transparent cover on the fingerprint recognition apparatus, where the second light reflection intensity $I_2$ mainly consists of two parts: the first part is an intensity $I_b$ of light which is refracted into the finger to be detected via the above transparent cover, then totally reflected in the finger to be detected, and again refracted into the photodetector via the transparent cover; and as shown by dashed lines in FIG. 4, the second part is an intensity $I_a$ of retroreflection light which is totally reflected into the photodetector by the transparent cover, and thus the second light reflection intensity $I_2$ may be approximately $I_2 = I_a + I_b$.

It should be understood that, since $I_a$ is related to the color and roughness of the object, there will be a difference between reflection intensities $I_a$ of the artificial body fingerprint and the living body fingerprint when color difference and roughness difference exist between the artificial body and a real finger. Moreover, the intensity $I_b$ of the retroreflection light is also related to an optical characteristic of the object itself, and generally, when there is a great difference between the artificial body and the living body, an retroreflection intensity $I_b$ of the artificial body approaches zero.

Therefore, it may be judged that the finger to be detected is the living body by judging when a first light reflection intensity $I_2$ is within a second threshold interval $T_2$. For example, when $800 \leq I_2 \leq 2000$, a unit thereof is also LSB, and it should be understood that the above numerical values are merely exemplary, and the present disclosure is not limited to this.

It should be understood that, when m is greater than 1, manners similar to the above are used to measure light reflection intensity of respective wavelengths, which will not be described redundantly herein.

Optionally, as an embodiment of the present disclosure, the step of judging whether the finger to be detected is a living body according to the plurality of optical signals of the finger to be detected includes: measuring, if the n wavelengths and the m wavelengths have the same k wavelengths, the first light reflection intensities $I_{11}, I_{12}, \ldots, I_{1k}$ the second light reflection intensities $I_{21}, I_{22}, \ldots, I_{2k}$ using the k wavelengths, and determining that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \leq i \leq k$.

That is to say, after the first light reflection intensity $I_1$ and the second light reflection intensity $I_2$ are measured using light in the same frequency band, a living body judgment may be performed by comparing any linear combination of the two parameters with a preset third threshold. It should be understood that, comparing a combination of $I_1$, $I_a$ and $I_b$ with a set threshold may also be used as a basis for a living body fingerprint judgment.

Specifically, Table 1 exemplarily shows value ranges of $I_1$ and $I_2$.

TABLE 1

| Category | Living body range | Artificial body range | Threshold setting |
|---|---|---|---|
| $I_1$ | 200~500 | 800~1500 | 100~650 |
| $I_2$ | 800~2000 | 0~400 | 600~2100 |
| $I_2 - I_1$ | 300~1800 | −1500~−400 | 200~2000 |

It should be understood that, the living body judgment is performed using light reflection intensities of the finger to be detected approaching the fingerprint recognition apparatus and touching the finger recognition apparatus in the above, which may quickly accomplish the living body judgment.

Figure 5:
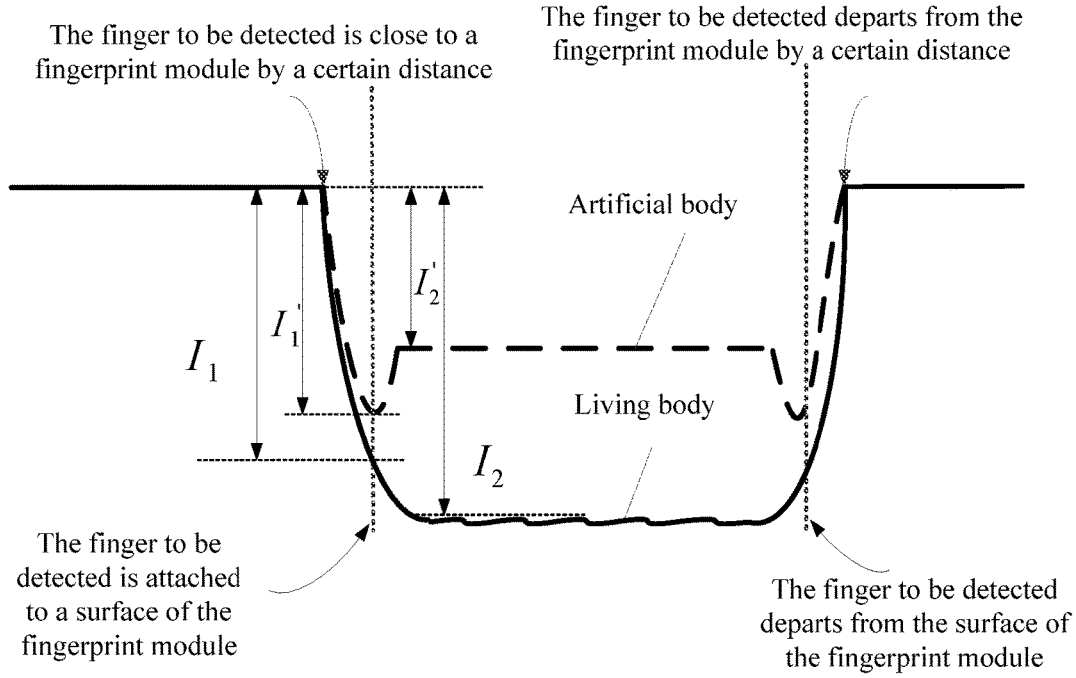
FIG. 5 is a schematic diagram of a fingerprint recognition method of an embodiment of the present disclosure.

FIG. 5 is a schematic diagram of a fingerprint recognition method of an embodiment of the present disclosure.

As shown in FIG. 5, under irradiation of a certain wavelength, dashed lines are a first light reflection intensity and a second light reflection intensity $I_2'$ which are measured when the finger to be detected is the artificial body, and solid lines are a first light reflection intensity $I_1$ and a second light reflection intensity $I_2$ which are measured when the finger to be detected is the living body fingerprint.

It can be seen from FIG. 5 that, when the finger to be detected is at a certain distance from the fingerprint recognition apparatus, i.e., not touching a fingerprint recognition module, since the of the artificial body is different from the $I_1$ of the living body, whether a detected fingerprint is the living body fingerprint may be judged through whether the measured first light reflection intensity belongs to the first threshold interval.

In addition, it can be seen from FIG. 5 that, when the finger to be detected touches the fingerprint recognition apparatus, since the $I_2'$ of the artificial body is different from the $I_2$ of the living body, whether a detected fingerprint is the living body fingerprint may be judged through whether the measured second light reflection intensity belongs to the second threshold interval.

It should be understood that, after the first light reflection intensity $I_1$ and the second light reflection intensity $I_2$ are measured, the living body judgment may be performed by comparing any linear combination of the two parameters with the set third threshold.

The embodiments of the present disclosure judge whether the finger to be detected is a living body according to a light reflection intensity of the finger to be detected. Therefore, the method provided in the embodiments of the present disclosure may improve the security of the fingerprint recognition technology, and may effectively avoid the problem that fingerprint recognition is cracked using an artificial body fingerprint.

Optionally, as an embodiment of the present disclosure, the step of judging whether the finger to be detected is a living body according to the plurality of optical signals of the finger to be detected includes: determining whether the finger to be detected is the living body according to whether the plurality of optical signals of the finger to be detected comply with a heart rate characteristic.

Optionally, as an embodiment of the present disclosure, the step of determining whether the finger to be detected is the living body according to whether the plurality of optical signals of the finger to be detected comply with a heart rate characteristic includes: acquiring the plurality of optical signals of the finger to be detected using light wave(s) of s wavelengths, the plurality of optical signals being photoplethysmography (English: photoplethysmography, PPG for short) signals $S_1, S_2, \ldots, S_s$, where an $i^{th}$ wavelength in the s wavelengths corresponds to an $i^{th}$ PPG signal $S_i$, and the $i^{th}$ PPG signal $S_i$ has a period being $P_i$, and an amplitude being $A_i$; and it is determined that the finger to be detected is the living body when the period being $P_i$ is within a fourth threshold interval $T_{4i}$, and the amplitude being $A_i$ is within a fifth threshold interval $T_{5i}$, where $1 \leq i \leq s$.

Since a PPG signal of the living body complies with a characteristic of a heart rate signal, whether the finger to be detected is the living body may be determined by detecting the period and amplitude of the PPG signal of the finger to be detected, and it should be understood that, whether the finger to be detected is the living body may be determined using other characteristics of the PPG signal.

It should be understood that the above s wavelengths and the above m or n wavelengths may be the same, or may be different, and the present disclosure is not limited to this.

Optionally, as an embodiment of the present disclosure, the step of judging whether the finger to be detected is a living body according to the plurality of optical signals of the finger to be detected includes: measuring, when the finger to be detected is irradiated using a light wave of a first wavelength, a first optical signal of the finger to be detected, then acquiring a direct current component of the first optical signal and an alternating current component of the first optical signal; measuring, when the finger to be detected is irradiated using a light wave of a second wavelength, a second optical signal of the finger to be detected, then acquiring a direct current component of the second optical signal and an alternating current component of the second optical signal, where the first wavelength and the second wavelength are different; acquiring blood oxygen saturation of the finger to be detected using the direct current component of the first optical signal, the alternating current component of the first optical signal, the direct current component of the second optical signal and the alternating current component of the second optical signal; and determining that the finger to be detected is the living body when the blood oxygen saturation is within a sixth threshold interval.

It should be understood that, the above first wavelength may be selected from the foregoing m and n or s wavelengths, and may also be other wavelengths, and the present disclosure is not limited to this.

Specifically, since the oxyhemoglobin and deoxyhemoglobin in the blood of a human body have different rates of absorbing for incident light of different wavelengths, when tissue is irradiated using light of two specific wavelengths, for example, when a light wave of the first wavelength is red light, and a light wave of the second wavelength is infrared light, and if it is defined that the acquired alternating current component of the first PPG signal is $AC_{red}$, the acquired direct current component of the first PPG signal is $DC_{red}$, the acquired alternating current component of a second PPG signal is $AC_{IR}$, and the acquired direct current component of the second PPG signal is $DC_{IR}$, by applying the Lambert-Bear law and according to a definition of the blood oxygen saturation (English: Blood Oxygen Saturation, $SpO_2$ for short), it may be derived that an approximate formula of arterial blood oxygen saturation is:

$SpO_2 = a + b \cdot R$, where a and b are constants $$R = \frac{AC_{red}/DC_{red}}{AC_{IR}/DC_{IR}}$$

An optical module is used to simultaneously collect PPG signals of light of two wavelengths, for example, the red light and the infrared light, and respectively extract a direct current component and an alternating current component corresponding to the PPG signals, and thus the blood oxygen saturation may be calculated in accordance with the above formula. Medical statistics show that the arterial blood oxygen saturation ($SpO_2$) of a normal human body should not be less than 94%, that is, a fourth threshold interval is greater than or equal to 94%. The blood oxygen saturation obtained through a calculation is compared with a preset threshold, and when the blood oxygen saturation of an object to be detected is greater than the preset threshold, it is judged that the object is a living body; otherwise, it is an artificial body. It should be understood that the value of the above fourth threshold interval is merely exemplary, and the present disclosure is not limited to this.

Figure 6:
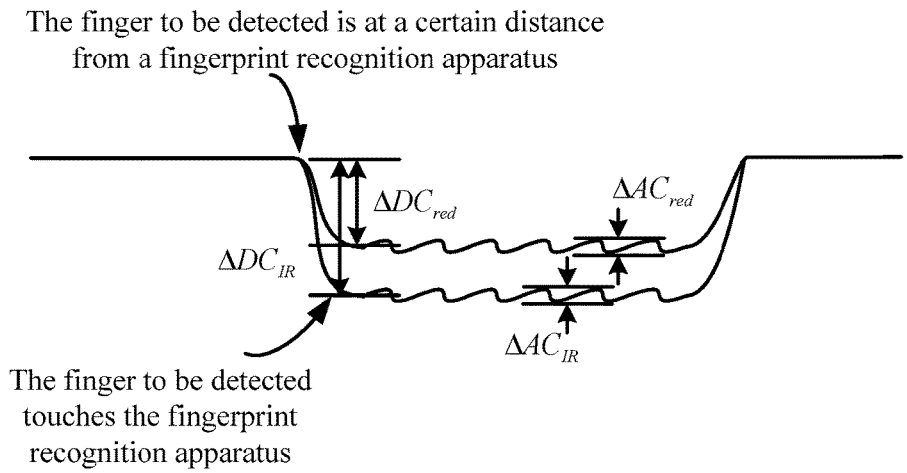
FIG. 6 is a schematic diagram of a PPG signal of an embodiment of the present disclosure.

FIG. 6 shows a schematic diagram of an optical signal of an embodiment of the present disclosure. As shown in FIG. 6, the above line represents a first optical signal obtained under the irradiation of the red light, and the signal may be classified into an alternating current signal of the first optical signal and a direct current signal of the first optical signal. FIG. 6 shows a variation quantity $\Delta DC_{red}$ of the direct current signal of the first optical signal in the process from the finger to be detected being at a certain distance from the fingerprint recognition apparatus to completely touching the fingerprint recognition apparatus, and a signal difference between a wave crest and a wave trough of the first optical signal is $\Delta AC_{red}$. Similarly, FIG. 6 further shows a schematic diagram of a second optical signal, and the bottom line represents a second optical signal obtained under the irradiation of the infrared light.

It should be understood that, specifically, the first optical signal may be a first PPG signal, and the second optical signal may be a second PPG signal; and descriptions will be made in the embodiments of FIGS. 7 to 8 below by specifically taking the PPG signal as an example.

Figure 7:
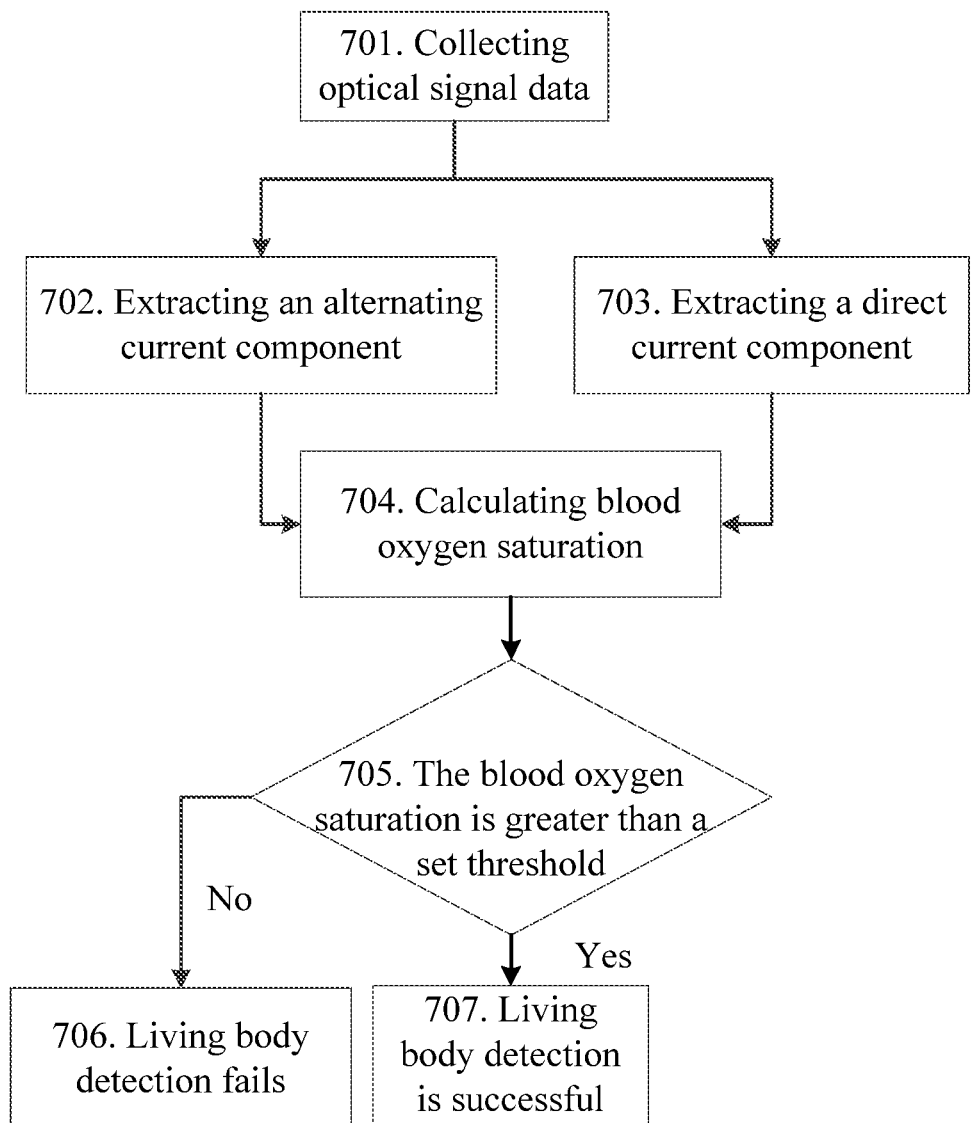
FIG. 7 shows a schematic flowchart of a method of an embodiment of the present disclosure.

FIG. 7 shows a schematic flowchart of a method of an embodiment of the present disclosure. As shown in FIG. 7, a executive body of the method is a fingerprint recognition apparatus, and the specific steps are as follows:

Step 701, the fingerprint recognition apparatus collects optical signal data. Preferably, the red light and the infrared light are adopted to respectively irradiate the finger to be detected to obtain the first PPG signal and the second PPG signal.

Step 702, alternating current components of the first PPG signal and the second PPG signal are extracted.

Step 703, direct current components of the first PPG signal and the second PPG signal are extracted.

Step 704, the blood oxygen saturation is calculated using the direct current components of the first PPG signal, the direct current components of the second PPG signal, the alternating current components of the first PPG signal and the alternating current components of the second PPG signal.

Step 705, a value of the blood oxygen saturation obtained through a calculation in the above step is compared with a preset threshold, and if the value of the blood oxygen saturation obtained through the calculation is within a threshold interval, for example, being greater than a specific threshold, it may be determined that living body detection is successful, i.e., step 707; otherwise, step 706 is entered, and it is determined that the living body detection fails.

Optionally, as an embodiment of the present disclosure, the method further includes: determining, if there are M kinds of judgment manners and combination manners thereof for the judging whether the finger to be detected is a living body according to the plurality of optical signals of the finger to be detected, whether the finger to be detected is the living body by selecting and using one or more of the M kinds of manners according to a requirement on a security level of an application scenario.

Specifically, it can be known from the above descriptions that there are many kinds of judgment manners of judging whether the finger to be detected is the living body, and different judgment manners of judging whether the finger to be detected is the living body may have different results, and also need different detection times. A judgment performed using a plurality of living body detection manners simultaneously will be more reliable, which are followed by more demands on time, or resource costs.

Therefore, it is put forward that different security levels may be selected for different application scenarios. For example, optionally, two security strategies are put forward: a low security level strategy and a high security level strategy. A user may select a fingerprint recognition manner according to a requirement on a security level.

Specifically, one or more of the methods listed above may be used to perform the living body detection at a low security level, for example, whether the finger to be detected is the living body may be judged only in an optical living body detection manner, and when a threshold condition of a light intensity is satisfied, it may be determined that it is the living body fingerprint without performing a threshold judgment of the blood oxygen saturation.

It should be understood that the low security level strategy may set to be one or more specific detection manners, and when the finger to be detected are judged to be the living body in all the detection manners, it is judged that the finger to be detected is the living body; or when the finger to be detected are judged to be the living body in at least some of the detection manner, it may also be judged that the finger to be detected is the living body.

Specifically, the detection manners of the low security level may be applied to realize quick unlocking, for example, a living body recognition time is less than 50 ms, bright screen fingerprint unlocking, application unlocking, etc., and thus an application layer is supported to select and use the security level.

In the high security level strategy, it is required to select more detection manners than those at the low security level to perform the living body detection, for example, not only the optical living body detection manner is required to be performed to judge whether the finger to be detected is the living body, but also the threshold judgment of the blood oxygen saturation is required to be performed, and when the two detection manners both detect that it is the living body fingerprint, it is judged that the finger to be detected is the living body fingerprint.

It should be understood that the embodiments of the present disclosure are not limited to the two security levels listed above, and may also put forward other security levels.

In other words, in one security level strategy, a combination of one or more detection manners may be selected to comprehensively judge that the finger to be detected is the living body fingerprint when conditions of these detection manners are satisfied.

Figure 8:
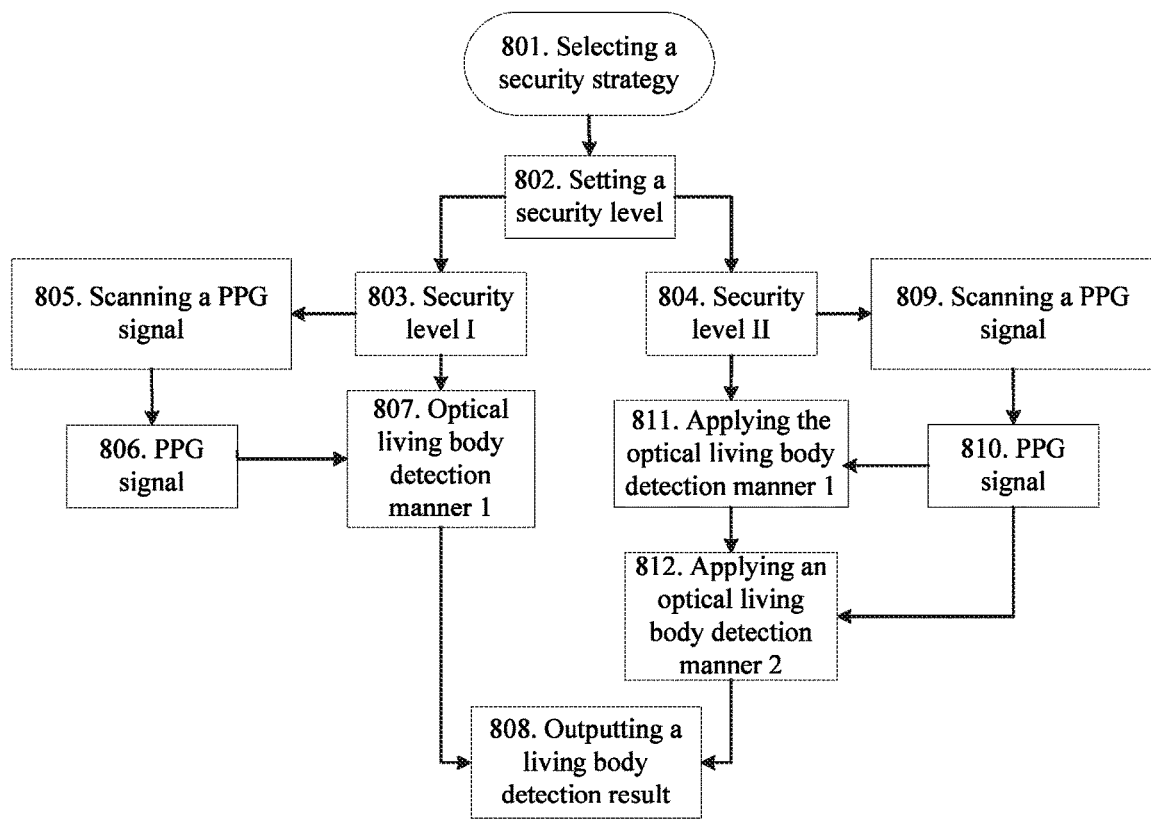
FIG. 8 shows a schematic flowchart of performing fingerprint recognition using a security strategy.

FIG. 8 shows a schematic flowchart of performing fingerprint recognition using a security strategy.

As shown in FIG. 8, in step 801, user equipment may select a security strategy for living body fingerprint recognition in an application layer.

In step 802, a selected security level is set, and in step 803, if a security level I is selected, step 805 is entered to scan a PPG signal, and the PPG signal is obtained through step 806.

In step 807, an optical living body detection manner I is used to acquire an optical living body detection result, and the living body detection result is output through step 808.

If a security level II is selected in step 804, step 809 is entered to scan a PPG signal, and the PPG signal is acquired through step 810. In step 811, an optical living body detection result is acquired using the optical living body detection manner I and the PPG signal obtained in step 809.

Besides, step 812 is further required to an optical living body detection result using an optical living body detection manner II and the PPG signal obtained in step 809.

When the detection results in step 811 and step 812 both judge that the finger to be detected is the living body, it is determined that it is the living body fingerprint; otherwise, it is not the living body fingerprint, and the optical living body detection results are output through step 808.

Therefore, by setting different security strategies and security levels, a user may be enabled to select different fingerprint recognition methods according to actual needs, and thus user experience may be enhanced.

Figure 9:
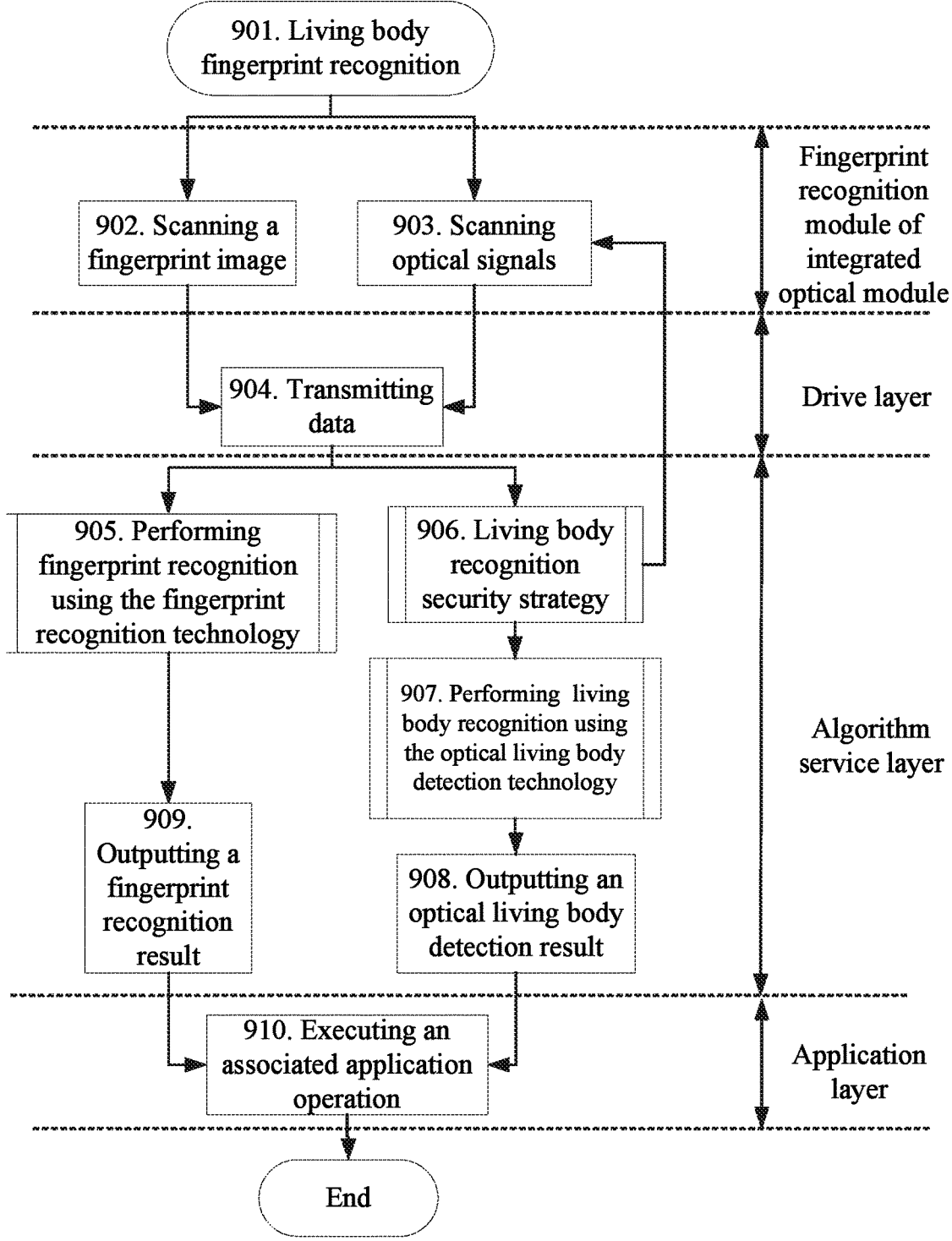
FIG. 9 shows a schematic flowchart of living body detection of an embodiment of the present disclosure.

FIG. 9 shows a schematic flowchart of living body detection of an embodiment of the present disclosure. Since an execution process of the optical living body detection as described above requires a period of time, and the original fingerprint recognition and matching on the fingerprint recognition apparatus also require a period of time, in order to shorten the operation time of the user and improve usage experience, the optical living body detection as described above and the original fingerprint recognition matching may be performed simultaneously. It is determined that the fingerprint recognition of the finger to be detected is successful when it is determined that the finger to be detected is the living body and the fingerprint matching of the finger to be detected is successful.

As shown in FIG. 9, a procedure of recognizing the living body fingerprint starts from step 901.

In a fingerprint recognition module of an integrated optical module, fingerprint image scanning in step 902 and optical signal scanning in step 903 are performed simultaneously.

Data transmission in step 904 is performed in a drive layer so that the following step is performed in an algorithm service layer.

In step 905, a fingerprint image obtained in step 902 is processed according to the fingerprint recognition technology, and a fingerprint recognition result is output in step 909.

Meanwhile, a living body recognition security strategy is selected in step 906 to perform the living body recognition using the optical living body detection technology in step 907, and an optical living body detection result is output through step 908, i.e., judging whether the finger to be detected is the living body.

At last, in the application layer, step 910 is performed to execute an associated application operation and eventually output the fingerprint recognition result.

The embodiments of the present disclosure judge whether a finger to be detected is a living body according to signals of the finger to be detected, and determine that a fingerprint recognition result of the finger to be detected is successful when it is determined that the finger to be detected is the living body and fingerprint matching of the finger to be detected is successful. Therefore, the method provided in the embodiments of the present disclosure may improve the security of the fingerprint recognition technology, and may effectively avoid the problem that fingerprint recognition is cracked using an artificial body fingerprint.

Figure 10:
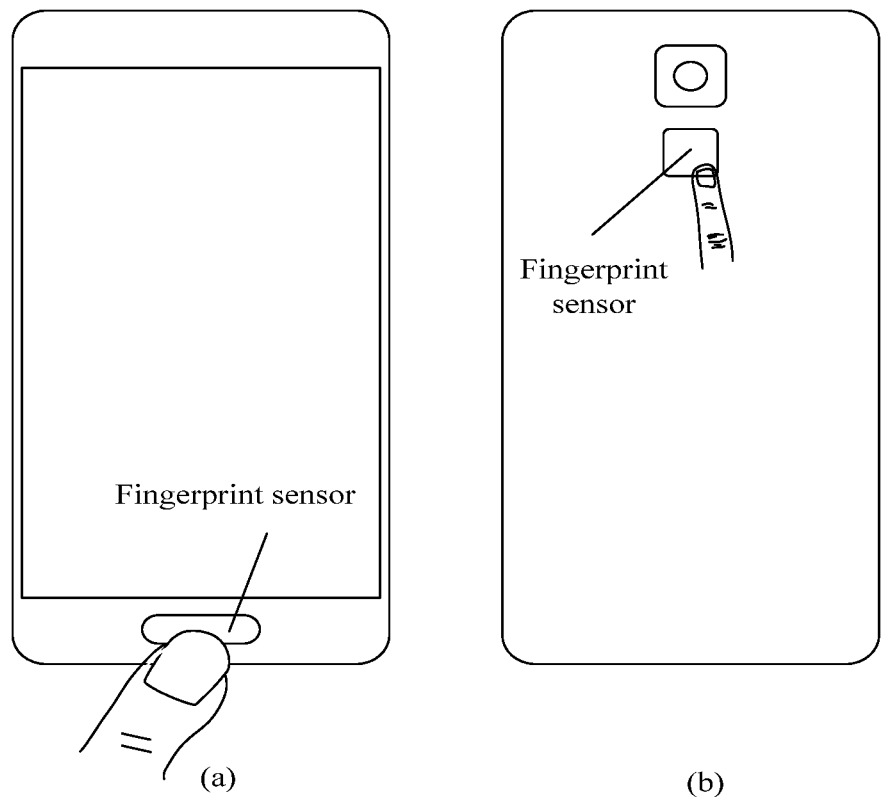
FIG. 10 is a schematic diagram of a fingerprint recognition apparatus of an embodiment of the present disclosure.

FIG. 10 is a schematic diagram of a fingerprint recognition apparatus of an embodiment of the present disclosure.

As shown in FIG. 10, the living body fingerprint recognition method mentioned in the present disclosure may be applied in the fingerprint recognition module of the integrated optical module, and the fingerprint recognition module may be applied in fingerprint recognition schemes of front, and back or invisible fingerprint recognition (Invisible Fingerprint Sensor, IFS) of an intelligent cellphone terminal.

Specifically, when a finger presses a fingerprint module, the fingerprint module scans a fingerprint image and a PPG signal, a drive layer of a cellphone reads data collected by the fingerprint module and uploads same to an algorithm service layer of the cellphone, the algorithm service layer performs fingerprint recognition and living body recognition according to the fingerprint image and optical signal data and outputs a fingerprint recognition result and a living body recognition result, and an application layer executes relevant operations such as fingerprint unlocking, fingerprint payment, fingerprint registration and fingerprint login according to the results output by the algorithm service layer.

It should be understood that, the fingerprint recognition method put forward in the present disclosure is not limited to the application in the scenarios defined in the present embodiment, any fingerprint detection which may be performed using the method of the embodiments of the present disclosure falls within the protection scope of the present disclosure.

It should also be understood that, the above serial numbers are merely for convenience of describing the flow charts, and magnitude relationships of the serial numbers do not represent a sequential order of executing specific actions.

Figure 11:
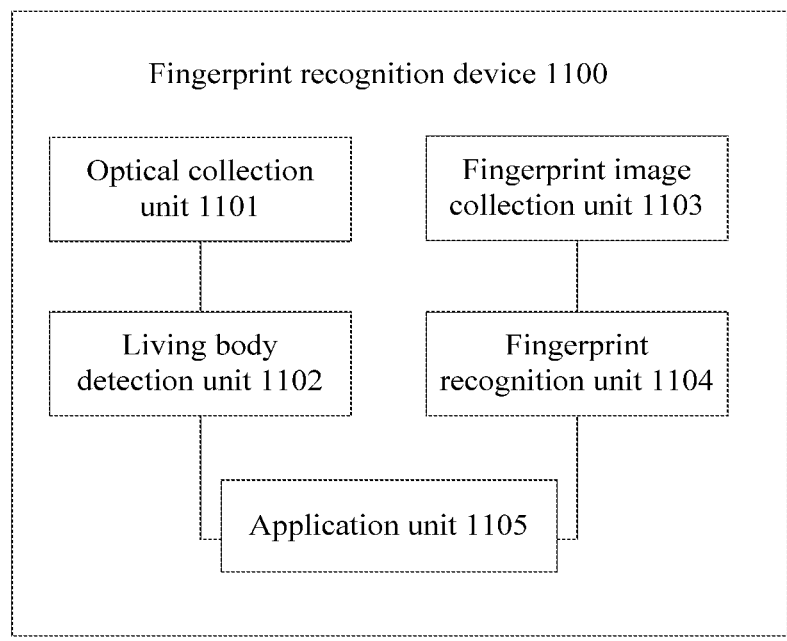
FIG. 11 shows a schematic block diagram of a fingerprint recognition apparatus of an embodiment of the present disclosure.

FIG. 11 shows a schematic block diagram of a fingerprint recognition apparatus of an embodiment of the present disclosure.

As shown in FIG. 11, the apparatus includes:

an optical collection unit 1101, the optical collection unit 1101 being configured to collect a plurality of optical signals of a finger to be detected;

a living body detection unit 1102, the living body detection unit 1102 being configured to judge whether the finger to be detected is a living body according to the plurality of optical signals of the finger to be detected;

a fingerprint image collection unit 1103, the fingerprint image collection unit 1103 being configured to collect a fingerprint image of the finger to be detected;

a fingerprint recognition unit 1104, the fingerprint recognition unit 1104 being configured to perform fingerprint matching on the fingerprint image of the finger to be detected, and judge whether a result of the fingerprint matching of the finger to be detected is successful; and an application unit 1105, the application unit 1105 being configured to determine that fingerprint recognition of the finger to be detected is successful when the finger to be detected is the living body and the fingerprint matching of the finger to be detected is successful.

The embodiments of the present disclosure judge whether a finger to be detected is a living body according to signals of the finger to be detected, and determine that a fingerprint recognition result of the finger to be detected is successful when it is determined that the finger to be detected is the living body and fingerprint matching of the finger to be detected is successful. Therefore, the method provided in the embodiments of the present disclosure may improve the security of the fingerprint recognition technology, and may effectively avoid the problem that fingerprint recognition is cracked using an artificial body fingerprint.

Optionally, as an embodiment of the present disclosure, the optical collection unit 1101 is specifically configured to: acquire the plurality of optical signals of the finger to be detected using light wave(s) of n wavelengths, the plurality of optical signals comprising first light reflection intensities $I_{11}, I_{12}, \ldots, I_{1n}$ caused by the finger to be detected before the finger to be detected touches the fingerprint recognition apparatus, where an $i^{th}$ wavelength in the n wavelengths corresponds to an $i^{th}$ first light reflection intensity $I_{1i}$; and the living body detection unit 1102 is configured to: determine that the finger to be detected is the living body when the first light reflection intensity $I_{1i}$ is within a first threshold interval $T_{1i}$, where $1 \le i \le n$.

Optionally, as an embodiment of the present disclosure, the optical collection unit 1101 is specifically configured to: acquire the plurality of optical signals of the finger to be detected using light wave(s) of m wavelengths, and measure second light reflection intensities $I_{21}, I_{22}, \ldots, I_{2m}$ caused by the finger to be detected when the finger to be detected touches the fingerprint recognition apparatus, where an $i^{th}$ wavelength in the m wavelengths corresponds to an $i^{th}$ second light reflection intensity $I_{2i}$; and the living body detection unit 1102 is configured to: determine that the finger to be detected is the living body when the second light reflection intensity $I_{2i}$ is within a second threshold interval $T_{2i}$, where $1 \le i \le m$.

Optionally, as an embodiment of the present disclosure, the living body detection unit 1102 is specifically configured to: measure, if the n wavelengths and the m wavelengths have the same k wavelengths, the first light reflection intensities $I_{11}, I_{12}, \ldots, I_{1k}$ and the second light reflection intensities $I_{21}, I_{22}, \ldots, I_{2k}$ using the k wavelengths, and determine that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \le i \le k$.

Optionally, as an embodiment of the present disclosure, the optical collection unit 1101 is configured to: determine whether the finger to be detected is the living body according to whether the plurality of optical signals of the finger to be detected comply with a heart rate characteristic.

Optionally, as an embodiment of the present disclosure, the optical collection unit 1101 is specifically configured to: acquire the plurality of optical signals of the finger to be detected using light wave(s) of s wavelengths, the plurality of optical signals being PPG signals $S_1, S_2, \ldots, S_s$, where an $i^{th}$ wavelength in the s wavelengths corresponds to an $i^{th}$ PPG signal $S_i$, and the $i^{th}$ PPG signal Si has a period being $P_i$, and an amplitude being $A_i$; and the living body detection unit is specifically configured to: determine that the finger to be detected is the living body when the period being $P_i$ is within a fourth threshold interval $T_{4i}$, and the amplitude being $A_i$ is within a fifth threshold interval $T_{5i}$, where $1 \le i \le s$.

Optionally, as an embodiment of the present disclosure, the optical collection unit 1101 is specifically configured to: measure, when the finger to be detected is irradiated using a light wave of a first wavelength, a first optical signal of the finger to be detected, then acquire a direct current component of the first optical signal and an alternating current component of the first optical signal; and measure, when the finger to be detected is irradiated using a light wave of a second wavelength, a second optical signal of the finger to be detected, then acquire a direct current component of the second optical signal and an alternating current component of the second optical signal, where the first wavelength and the second wavelength are different; and the living body detection unit 1102 is specifically configured to: acquire blood oxygen saturation of the finger to be detected using the direct current component of the first optical signal, the alternating current component of the first optical signal, the direct current component of the second optical signal and the alternating current component of the second optical signal; and determine that the finger to be detected is the living body when the blood oxygen saturation is within a sixth threshold interval.

Optionally, as an embodiment of the present disclosure, the application unit 1105 is specifically configured to: determine, if there are M kinds of judgment manners and combination manners for the judging whether the finger to be detected is a living body according to the plurality of optical signals of the finger to be detected, whether the finger to be detected is the living body by selecting and using one of the M kinds of manners according to a requirement on a security level of an application scenario.

The embodiments of the present disclosure judge whether a finger to be detected is a living body according to signals of the finger to be detected, and determine that a fingerprint recognition result of the finger to be detected is successful when it is determined that the finger to be detected is the living body and fingerprint matching of the finger to be detected is successful. Therefore, the method provided in the embodiments of the present disclosure may improve the security of the fingerprint recognition technology, and may effectively avoid the problem that fingerprint recognition is cracked using an artificial body fingerprint.

A fingerprint recognition device 1100 may be used to execute respective procedures and/or steps corresponding to a network device in the above method embodiments, which will not be described redundantly herein to avoid repetition.

A person of ordinary skill in the art may be aware that, units and algorithm steps of the examples described in the embodiments disclosed in the text may be implemented by electronic hardware or a combination of computer software and the electronic hardware. Whether these functions are executed in a manner of hardware or software depends on the specific applications and design constraint conditions of the technical solution. A person skilled may implement the described functions by using different methods for each specific application, but this implementation should not be considered to be beyond the scope of the present disclosure.

A person skilled in the art may clearly understand that, for convenience and simplicity of description, the specific working processes of the system, the apparatus and the units described above may refer to corresponding processes in the foregoing method embodiments, which will not be described redundantly herein.

In the several embodiments provided in the present application, it should be understood that, the disclosed system, apparatus and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or be not executed. From another point of view, the displayed or discussed mutual coupling or direct coupling or communication connection may be indirect coupling or communication connection of apparatuses or units through some interfaces, and may also be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual needs.

In addition, in various embodiments of the present disclosure, the respective functional units may be integrated in one processing unit, or the respective functional units may physically exist separately, or two or more units may be integrated in one unit.

If the function is implemented in the form of a software functional unit and is sold or used as an independent product, it may be stored in a computer readable storage medium. Based on such an understanding, the technical solution of the present disclosure substantially, or the part of the present disclosure making contribution to the prior art, or a part of the technical solution may be embodied in the form of a software product, and the computer software product is stored in a storage medium, which includes multiple instructions enabling a computer device (which may be a personal computer, a server, a network device or the like) to execute all of or a part of the steps of the methods in the respective embodiments of the present disclosure. In addition, the foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

Described above is the specific embodiments of the present disclosure only, but the protection scope of the present disclosure is not limited to this, a person skilled who is familiar with the present technical field could readily think of variations or substitutions within the technical scope disclosed by the present disclosure, and these variations or substitutions shall be encompassed within the protection scope of the present disclosure. Therefore, the protection scope of the present disclosure shall be defined by the claims.

The invention claimed is:

1. A fingerprint recognition method, wherein a fingerprint recognition apparatus which executes the method comprises a light source, a photodetector, a transparent cover, and a fingerprint sensor, the method comprising:

collecting a plurality of optical signals of a finger to be detected; and judging whether the finger to be detected is a living body according to the plurality of optical signals of the finger to be detected;

wherein judging whether the finger to be detected is a living body according to the plurality of optical signals of the finger to be detected comprises:

acquiring the plurality of optical signals of the finger to be detected using light wave(s) of m wavelengths, and measuring second light reflection intensities $I_{21}$, $I_{22}$, ..., $I_{2m}$ caused by the finger to be detected when the finger to be detected touches the fingerprint recognition apparatus, wherein an $i^{th}$ wavelength in the m wavelengths corresponds to an $i^{th}$ second light reflection intensity $I_{2i}$; and determining that the finger to be detected is the living body when the second light reflection intensity $I_{2i}$ is within a second threshold interval $T_{2i}$, where $1 \le i \le m$;

wherein the second light reflection intensity $I_{2i}$, comprises two parts:

a first part being an intensity $I_b$ of light which is refracted into the finger to be detected via the transparent cover, then totally reflected in the finger to be detected, and again refracted into the photodetector via the transparent cover; and a second part being an intensity $I_a$ of retroreflection light which is totally reflected into the photodetector by the transparent cover.

2. The method according to claim 1, wherein collecting optical signals of a finger to be detected comprises:

acquiring the plurality of optical signals of the finger to be detected using light wave(s) of n wavelengths, the plurality of optical signals comprising first light reflection intensities $I_{11}$, $I_{12}$, ..., $I_{1n}$ caused by the finger to be detected before the finger to be detected touches a fingerprint recognition apparatus, wherein an $i^{th}$ wavelength in the n wavelengths corresponds to an $i^{th}$ first light reflection intensity $I_{1i}$; and wherein judging whether the finger to be detected is a living body according to the optical signals of the finger to be detected comprises:

determining that the finger to be detected is the living body when the first light reflection intensity $I_{1i}$ is within a first threshold interval $T_{1i}$, where $1 \le i \le n$.

3. The method according to claim 2, wherein collecting optical finals of a finger to be detected comprises:

measuring, if the n wavelengths and the m wavelengths have the same k wavelengths, the first light reflection intensities $I_{11}$, $I_{12}$, ..., $I_{1k}$ and the second light reflection intensities $I_{21}$, $I_{22}$, ..., $I_{2k}$ using the k wavelengths, and wherein judging whether the finger to be detected is a living body according to the optical signals of the finger to be detected comprises:

determining that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \le i \le k$.

4. The method according to claim 1, wherein collecting optical signals of a finger to be detected comprises:

acquiring the plurality of optical signals of the finger to be detected using a light wave of s wavelengths, the plurality of optical signals being PPG signals $S_1$, $S_2, \ldots, S_s$, wherein an $i^{th}$ wavelength in the s wavelengths corresponds to an $i^{th}$ PPG signal $S_i$, and the $i^{th}$ PPG signal $S_i$ has a period being $P_i$, and an amplitude being $A_i$; and wherein judging whether the finger to be detected is a living body according to the optical signals of the finger to be detected comprises:

determining that the finger to be detected is the living body when the period being $P_i$ is within a fourth threshold interval $T_{4i}$, and the amplitude being $A_i$ is within a fifth threshold interval $T_{5i}$, where $1 \le i \le s$.

5. The method according to claim 1, wherein collecting optical signals of a finger to be detected comprises:

measuring, when the finger to be detected is irradiated using a light wave of a first wavelength, a first optical signal of the finger to be detected, then acquiring a direct current component of the first optical signal and an alternating current component of the first optical signal;

measuring, when the finger to be detected is irradiated using a light wave of a second wavelength, a second optical signal of the finger to be detected, then acquiring a direct current component of the second optical signal and an alternating current component of the second optical signal, wherein the first wavelength and the second wavelength are different;

acquiring blood oxygen saturation of the finger to be detected using the direct current component of the first optical signal, the alternating current component of the first optical signal, the direct current component of the second optical signal and the alternating current component of the second optical signal; and wherein judging whether the finger to be detected is a living body according to the optical signals of the finger to be detected comprises:

determining that the finger to be detected is the living body when the blood oxygen saturation is within a sixth threshold interval.

6. The method according to claim 1, wherein the method further comprises:

judging, if there are M kinds of judgment manners and combination manners thereof for judging whether the finger to be detected is a living body according to the plurality of optical signals of the finger to be detected, whether the finger to be detected is the living body by selecting and using one of the M kinds of manners according to a requirement on a security level of an application scenario.

7. The method according to claim 1, wherein the method further comprises:

performing fingerprint matching on a fingerprint of the finger to be detected, and judging whether the fingerprint matching of the finger to be detected is successful; and determining that fingerprint recognition of the finger to be detected is successful when the finger to be detected is the living body and the fingerprint matching of the finger to be detected is successful.

8. A fingerprint recognition apparatus, comprising:

a light source;

a transparent cover;

a fingerprint sensor;

a photodetector, configured to acquire the optical signals of the finger to be detected using light wave(s) of m wavelengths, and measure second light reflection intensities $I_{21}, I_{22}, \ldots, I_{2m}$ caused by the finger to be detected when the finger to be detected touches the fingerprint recognition apparatus, wherein an $i^{th}$ wavelength in the m wavelengths corresponds to an $i^{th}$ second light reflection intensity $I_{2i}$; and a processor, configured to determine that the finger to be detected is the living body when the second light reflection intensity $I_{2i}$ is within a second threshold interval $T_{2i}$, where $1 \le i \le m$;

wherein the second light reflection intensity $I_{2i}$ comprises two parts:

a first part being an intensity $I_b$ of light which is refracted into the finger to be detected via the transparent cover, then totally reflected in the finger to be detected, and again refracted into the photodetector via the transparent cover; and a second part being an intensity $I_a$ of retroreflection light which is totally reflected into the photodetector by the transparent cover.

9. The fingerprint recognition apparatus according to claim 8, wherein the photodetector is configured to acquire the plurality of optical signals of the finger to be detected using light wave(s) of n wavelengths, the plurality of optical signals comprising first light reflection intensities $I_{11}, I_{12}, \ldots, I_{1n}$ caused by the finger to be detected before the finger to be detected touches the fingerprint recognition apparatus, wherein an $i^{th}$ wavelength in the n wavelengths corresponds to an $i^{th}$ first light reflection intensity $I_{1i}$; and the processor is configured to determine that the finger to be detected is the living body when the first light reflection intensity $I_{1i}$ is within a first threshold interval $T_{1i}$, where $1 \le i \le n$.

10. The fingerprint recognition apparatus according to claim 9, wherein photodetector is further configured to:

measure, if the n wavelengths and the m wavelengths have the same k wavelengths, the first light reflection intensities $I_{11}, I_{12}, \ldots, I_{1k}$ and the second light reflection intensities $I_{21}, I_{22}, \ldots, I_{2k}$ using the k wavelengths, and the processor is further configured to determine that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \le i \le k$.

11. The fingerprint recognition apparatus according to claim 8, wherein the photodetector is configured to acquire the plurality of optical signals of the finger to be detected using a light wave of s wavelengths, the plurality of optical signals being PPG signals $S_1, S_2, \ldots, S_s$, wherein an $i^{th}$ wavelength in the s wavelengths corresponds to an $i^{th}$ PPG signal Si, and the $i^{th}$ PPG signal $S_i$ has a period being $P_i$, and an amplitude being $A_i$; and the processor is configured to determine that the finger to be detected is the living body when the period being $P_i$ is within a fourth threshold interval $T_{4i}$, and the amplitude being $A_i$ is within a fifth threshold interval $T_{5i}$, where $1 \le i \le s$.

12. The fingerprint recognition apparatus according to claim 8, wherein the photodetector is configured to measure, when the finger to be detected is irradiated using a light wave of a first wavelength, a first optical signal of the finger to be detected, then acquire a direct current component of the first optical signal and an alternating current component of the first optical signal; and measure, when the finger to be detected is irradiated using a light wave of a second wavelength, a second optical signal of the finger to be detected, then acquire a direct current component of the second optical signal and an alternating current component of the second optical signal, wherein the first wavelength and the second wavelength are different; and the processor is configured to acquire blood oxygen saturation of the finger to be detected using the direct current component of the first optical signal, the alternating current component of the first optical signal, the direct current component of the second optical signal and the alternating current component of the second optical signal; and determine that the finger to be detected is the living body when the blood oxygen saturation is within a sixth threshold interval.

13. The fingerprint recognition apparatus according to claim 8, wherein the processor is further configured to determine, if there are M kinds of judgment manners and combination manners for the judging whether the finger to be detected is a living body according to the plurality of optical signals of the finger to be detected, that the finger to be detected is the living body by selecting and using one of the M kinds of manners according to a requirement on a security level of an application scenario.

14. The fingerprint recognition apparatus according to claim 8, wherein the photodetector is further configured to collect a fingerprint image of the finger to be detected; and the processor is further configured to perform fingerprint matching on the fingerprint image of the finger to be detected, and judge whether a result of the fingerprint matching of the finger to be detected is successful; and determine that fingerprint recognition of the finger to be detected is successful when the finger to be detected is the living body and the fingerprint matching of the finger to be detected is successful.

15. A fingerprint recognition method, comprising:

collecting a plurality of optical signals of a finger to be detected; and judging whether the finger to be detected is a living body according to the plurality of optical signals of the finger to be detected;

wherein collecting optical signals of a finger to be detected comprises:

acquiring the plurality of optical signals of the finger to be detected using a light wave of s wavelengths, the plurality of optical signals being PPG signals $S_1$, $S_2$, ..., $S_s$, wherein an $i^{th}$ wavelength in the s wavelengths corresponds to an $i^{th}$ PPG signal $S_i$, and the $i^{th}$ PPG signal $S_i$ has a period being $P_i$, and an amplitude being $A_i$; and wherein judging whether the finger to be detected is a living body according to the plurality of optical signals of the finger to be detected comprises:

determining that the finger to be detected is the living body when the period being $P_i$ is within a fourth threshold interval $T_{4i}$, and the amplitude being $A_i$ is within a fifth threshold interval $T_{5i}$, where $1 \le i \le s$.

16. The method according to claim 15, wherein collecting optical signals of a finger to be detected-comprises:

acquiring the plurality of optical signals of the finger to be detected using light wave(s) of n wavelengths, the plurality of optical signals comprising first light reflection intensities $I_{11}$, $I_{12}$, ..., $I_{1n}$ caused by the finger to be detected before the finger to be detected touches a fingerprint recognition apparatus, wherein an $i^{th}$ wavelength in the n wavelengths corresponds to an $i^{th}$ first light reflection intensity $I_{1i}$; and wherein judging whether the finger to be detected is a living body according to the optical signals of the finger to be detected comprises:

determining that the finger to be detected is the living body when the first light reflection intensity $I_{1i}$ is within a first threshold interval $T_{1i}$, where $1 \le i \le n$.

17. The method according to claim 16, wherein collecting optical signals of a finger to be detected comprises:

acquiring the plurality of optical signals of the finger to be detected using light wave(s) of m wavelengths, and measuring second light reflection intensities $I_{21}$, $I_{22}$, ..., $I_{2m}$ caused by the finger to be detected when the finger to be detected touches the fingerprint recognition apparatus, wherein an $i^{th}$ wavelength in the m wavelengths corresponds to an $i^{th}$ second light reflection intensity $I_{2i}$; and wherein judging whether the finger to be detected is a living body according to the optical signals of the finger to be detected comprises:

determining that the finger to be detected is the living body when the second light reflection intensity $I_{2i}$ is within a second threshold interval $T_{2i}$, where $1 \le i \le m$.

18. The method according to claim 17, wherein collecting optical signals of a finger to be detected comprises:

measuring, if the n wavelengths and the m wavelengths have the same k wavelengths, the first light reflection intensities $I_{11}$, $I_{12}$, ..., $I_{1k}$ and the second light reflection intensities $I_{21}$, $I_{22}$, ..., $I_{2k}$ using the k wavelengths, and wherein judging whether the finger to be detected is a living body according to the optical signals of the finger to be detected comprises:

determining that the finger to be detected is the living body when a linear combination of a first light reflection intensity $I_{1i}$ obtained using a light wave of an $i^{th}$ wavelength in the k wavelengths and a second light reflection intensity $I_{2i}$ obtained using the light wave of the $i^{th}$ wavelength is within a third threshold interval $T_{3i}$, where $1 \le i \le k$.

19. The method according to claim 15, collecting optical signals of a finger to be detected comprises:

measuring, when the finger to be detected is irradiated using a light wave of a first wavelength, a first optical signal of the finger to be detected, then acquiring a direct current component of the first optical signal and an alternating current component of the first optical signal;

measuring, when the finger to be detected is irradiated using a light wave of a second wavelength, a second optical signal of the finger to be detected, then acquiring a direct current component of the second optical signal and an alternating current component of the second optical signal, wherein the first wavelength and the second wavelength are different;

acquiring blood oxygen saturation of the finger to be detected using the direct current component of the first optical signal, the alternating current component of the first optical signal, the direct current component of the second optical signal and the alternating current component of the second optical signal; and wherein judging whether the finger to be detected is a living body according to the optical signals of the finger to be detected comprises:

determining that the finger to be detected is the living body when the blood oxygen saturation is within a sixth threshold interval.

20. The method according to claim 15, wherein the method further comprises:
judging, if there are M kinds of judgment manners and combination manners thereof for judging whether the finger to be detected is a living body according to the plurality of optical signals of the finger to be detected, whether the finger to be detected is the living body by selecting and using one of the M kinds of manners according to a requirement on a security level of an application scenario.

* * * * *